United States Patent
Hunkar et al.

[15] 3,694,424
[45] Sept. 26, 1972

[54] METHOD OF INTERNALLY COOLING A BLOW MOLDED ARTICLE

[72] Inventors: Denes B. Hunkar, Cincinnati, Ohio; Jeno Peter Bercz, Haddon Tp., N.J.

[73] Assignee: Hunkar Laboratories Inc., Cincinnati, Ohio

[22] Filed: Oct. 13, 1970

[21] Appl. No.: 80,266

[52] U.S. Cl.....................................264/98, 425/326
[51] Int. Cl. ..........................B29c 17/07, B29c 25/00
[58] Field of Search..........264/94, 96, 97, 98, 99, 89; 18/5 BH; 425/326, 387

[56] References Cited

UNITED STATES PATENTS

| | | |
|---|---|---|
| 3,065,501 | 11/1962 | Gasmire...................264/98 X |
| 3,127,458 | 3/1964 | Scott, Jr. et al...............264/98 |

Primary Examiner—Robert F. White
Assistant Examiner—J. H. Silbaugh
Attorney—Wood, Herron & Evans

[57] ABSTRACT

A method of blow molding a hollow article of thermoplastic material in which the newly formed article is cooled internally by explosively injecting into the article a charge of a highly pressurized and chilled mixture of air and water.

11 Claims, 6 Drawing Figures

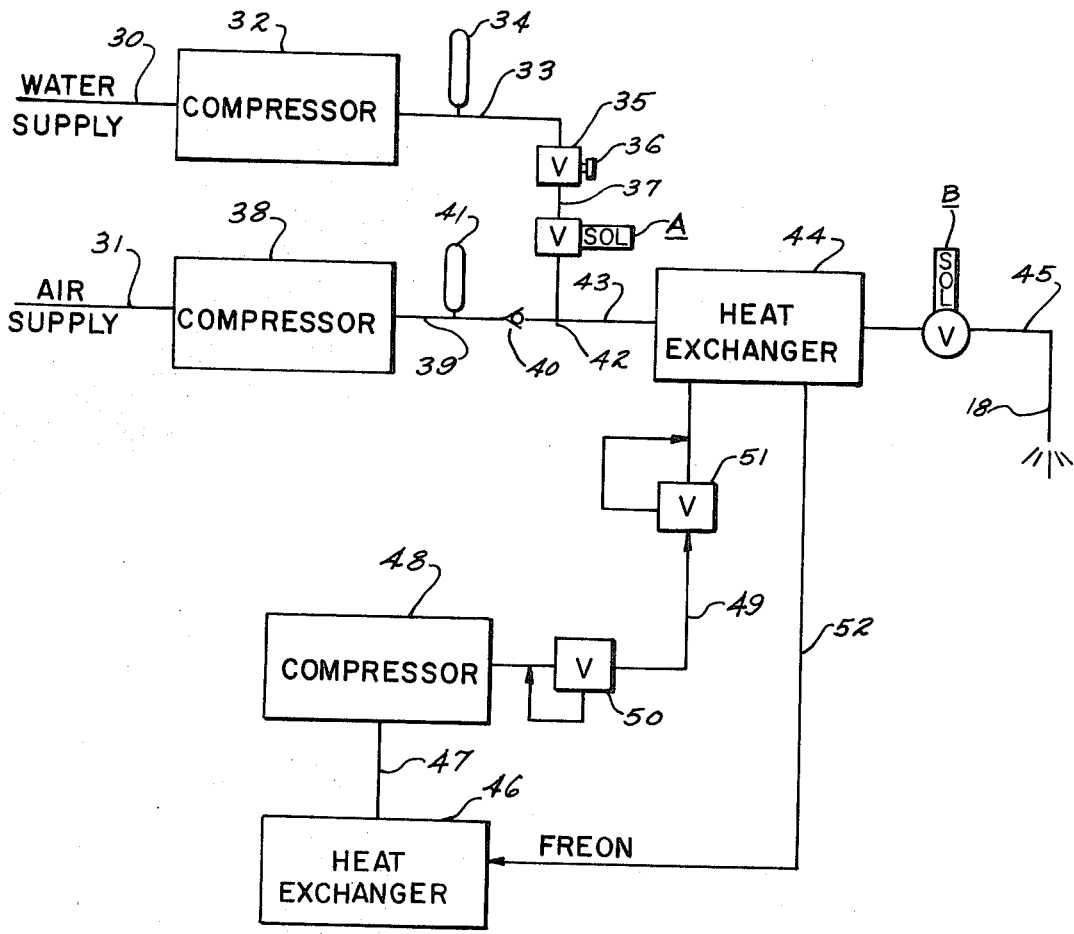
*Fig. 1*
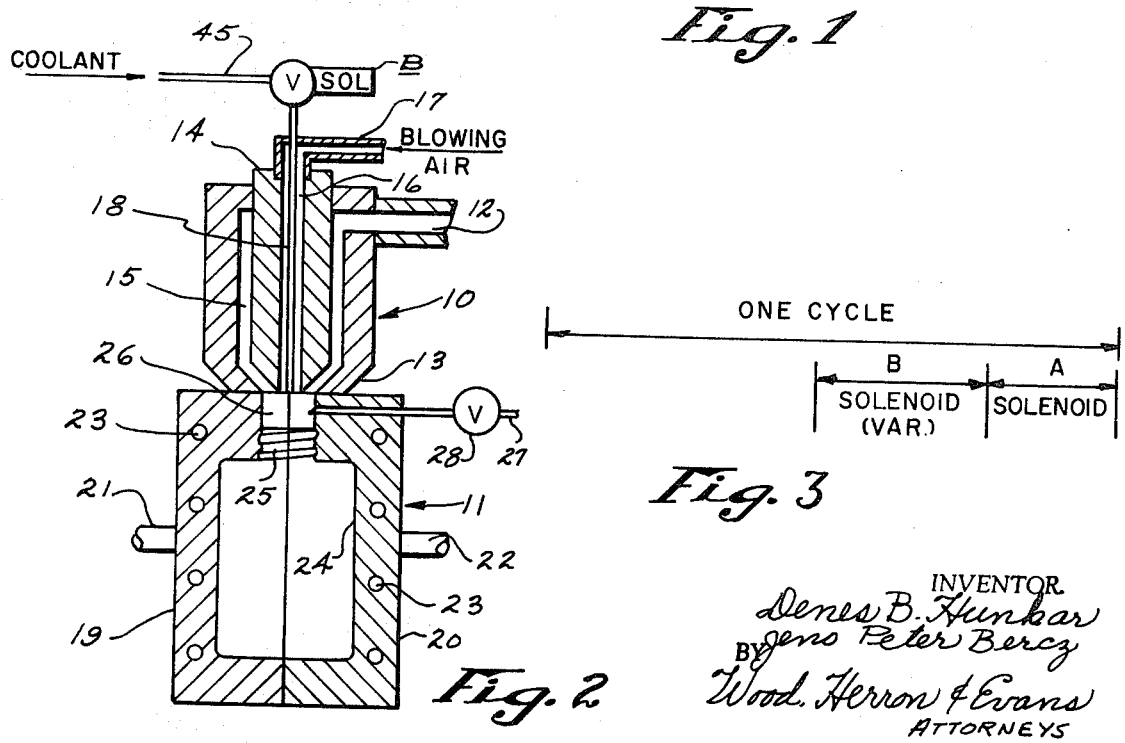
*Fig. 2*
*Fig. 3*

METHOD OF INTERNALLY COOLING A BLOW MOLDED ARTICLE

This invention relates to the art of blow molding hollow plastic articles such as bottles of thermoplastic materials and it is directed to an improved method of rapidly cooling the interior of a newly formed article.

In the typical method, a tube or parison of molten plastic is extruded from a die, pinched between the halves of a mold, and then pressurized internally to expand outwardly and into contact with the inner surfaces of the mold parts which give the article its finished shape. It has been the common practice to run coolant such as water through the mold parts in order to cool the newly formed article externally. This type of cooling, used alone, has proved to be slow in production, and as a result, a number of methods have been developed for cooling the article internally simultaneously with the external cooling in order to increase production.

A stream of air has been used. This increased the rate of internal cooling, but not significantly. Water has been sprayed into the newly formed articles. This method increased the cooling rate substantially over the use of air, but it left water in the articles and such residual water cannot be tolerated in many instances.

The above two methods have been combined, that is, water has been sprayed into the article followed by a blow-through of air to rid the article of the water. In a more sophisticated method, air has been circulated through the article under pressure for blowing purposes and thereafter water sprayed into the circulating air for cooling and drying purposes. These later methods solved the residual water problems, but they were still comparatively slow productionwise. However, when considered solely from the viewpoint of coolant costs, these methods have not been surpassed. For example, liquid carbon dioxide has been used as a coolant, and rather effectively, from the viewpoint of increased production, and it is perhaps the fastest known method in the prior art of cooling a blow molded plastic article. But, the cost of this coolant is very high compared to an air-water coolant.

Thus, the primary objective of this invention has been to provide a method of blow molding a plastic article wherein the article is cooled internally using an air-water coolant, for economy, but which is capable of use at a rate of production comparable to the liquid carbon dioxide method.

In the preferred embodiment of the invention, air at ambient temperature is used for blowing the article following known techniques. External cooling of the article is achieved as has been done in the past by using coolant in the mold parts. The novelty of the improvement of this invention resides in the way in which internal cooling is achieved.

A pressurized and chilled mixture of air and water is used. In this state the mixture consists of water that is supersaturated with air, and air. Preferably, the pressure to which the mixture is subjected is in the range of from about 1,000 to 2,000 pounds per square inch. As will appear, the limits of this range, (and particularly the upper one) are not critical to the successful practice of the method. The important consideration is that the chilled mixture be pressurized to an extent substantially greater than the pressure within the newly formed article into which it is to be injected such that a charge of the mixture released into the article literally explodes.

The sudden pressure drop at the time of the injection causes a substantially instantaneous, adiabatic expansion of the air of the mixture, including the air with which the water is supersaturated. The explosive nature of the injection causes an immediate dispersion of the mixture to all internal surfaces of the article so that regardless of the complexities of the internal configuration of the article, it is coated throughout.

It is hypothesized that the explosive injection of the mixture results in a three phase system. Observations show that one phase consists of minute ice crystals. The second phase consists of minute drops of cooled and probably supercooled, water. The third phase is gaseous consisting of water vapor and air. Preferably only a single injection of the charge is made per article, i.e., a "one shot" injection.

The amount of water required per "shot" is surprisingly small because of the great degree of dispersion achieved by the explosive nature of the injection. As an example, approximately only 1 cc of water is required for a 22 oz. capacity bottle formed from about 36 grams of plastic. It may be observed, using a clear plastic bottle, that immediately following the explosive injection of the charge into an article, the entire internal surface thereof is coated substantially evenly throughout. Apparently, the minute ice crystals melt almost instantaneously upon contact with the hot internal walls of the article. In any event, the coating is in the form of exceedingly fine droplets of water, so small that there is little tendency for the droplets to coalesce and run so that the integrity of the coating is maintained to a great degree.

Preferably, the charge is injected into the newly formed article while it is still pressurized with blowing air, this pressure usually being around 80–90 pounds per square inch. This pressure condition is relatively insignificant compared to the high pressure of the charge and has little effect upon the dispersion of the components of the charge.

The immediate cooling effect obtained is the result of heat transferred from the walls of the article to the ice crystals, which melts them, to the minute droplets of cooled and possibly supercooled water, which heats them, and to the water vapor and air, which heats them. Of the three phases initially present (solid, liquid and gas), the heating of the solids — the melting of the ice crystals — is the most efficient cooling factor per unit of time. For this reason it is desired that a substantial quantity of ice crystals be present in the mixture discharged into the article. Conditions effecting the quantity of ice crystals present in the mixture, and ways to create substantial quantities therein, are discussed below.

At this stage, immediately following the explosive discharge of the mixture into the enclosed article, the walls of the article have been surface cooled and solidified both internally and externally, but the core area between surfaces is still molten or substantially molten. To achieve further rapid cooling, the article is opened to vent it to atmospheric pressure. Whereupon there follows a fast boil-off of the remaining droplets of water by the residual heat within the walls of the article. This cools the article to a point where it is sufficiently stable to be ejected from the mold.

Reference is now made to the accompanying drawings, in which:

FIG. 1 is a diagram illustrating the components of a system with which the method of this invention may be practiced;

FIG. 2 is a cross-sectional, diagrammatic view illustrating a typical blowing head and the mold parts associated with the blowing head during the formation of an article such as a bottle;

FIG. 3 is a diagram illustrating the timing of the operation of the solenoid valves shown in FIG. 1, and particularly their timing in relation to the cycle of operation for the formation of a single article;

Figure 4:
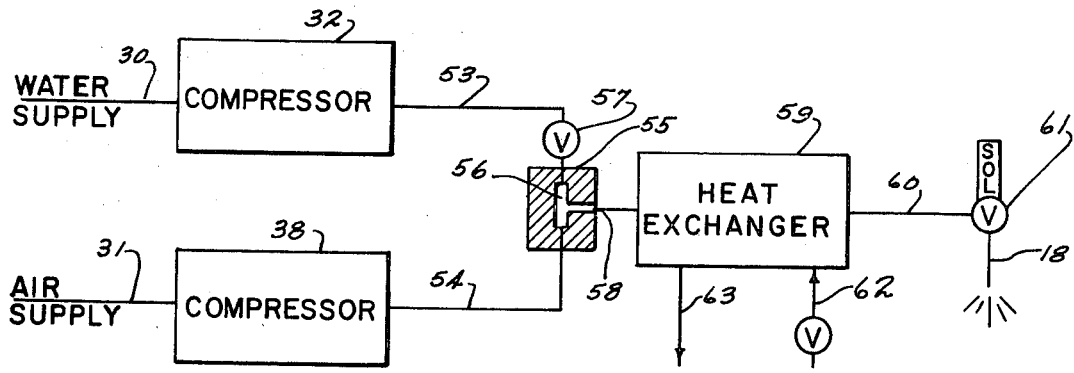
FIG. 4 is a diagram illustrating components of a modified system for performing the method of this invention.

Reference is now made to FIG. 2 which illustrates diagrammatically only the basic components of a blow molding machine with which the method of this invention may be practiced. This illustration is not intended to impose any limitation on the use of the invention but is merely illustrative. It will be apparent that the method may be practiced with many of the blow molding machines of the prior art and that it is particularly adapted for use with high production machines. In such machines it is common that a single blow head such as the one indicated generally at 10, is used with a plurality of mold sets such as the one illustrated generally at 11. These mold sets may be mounted upon a turret or other device such that one mold set at a time is brought into blowing association with the blow head 10. For example if four such sets of molds are carried on a revolvable turret, blowing may occur at the 12 o'clock position and ejection of a finished article from the mold taking place at the 9 o'clock position, the turret indexing through the 3 and 6 o'clock positions in the interim. It will be obvious that with more or less mold sets blowing and ejection can take place at various desired positions during one rotation of the turret.

The hot molten thermoplastic material from which plastic articles are blown comes to the head 10 through a passage (or "hot run") such as that designated 12. The head 10 has a hollow core as illustrated and it is preferred that its lower end be tapered as illustrated at 13. As is done in the prior art, a mandrel 14 is located in the center of the head 10 and a passageway 15 between the mandrel and the internal walls of head 10 is provided for the passage of the hot molten plastic down through the head. In the instance shown the mandrel 14 has a central bore 16 therethrough that is in communication at its upper end with a conduit such as the one shown at 17 for admission of blowing air into the hollow bore 16. A coolant pipe 18 extends downwardly through the center of the bore 16. This pipe 18 carries the air-water coolant, with which this invention is primarily concerned, down through the head 10 for discharge into a newly formed article in the mold 11.

Mold 11 is made up of two mold halves 19 and 20 that are adapted to move toward and from one another by means such as air cylinders (not shown) attached to the respective mold halves by means such as rods shown fragmentarily only at 21 and 22 respectively. Following known practices, each mold half has passageways such as those shown at 23-23 through which a coolant is circulated in order to cool a newly formed article externally. As shown, the mold halves are configured internally to form to body part at 24 of a bottle and a threaded neck portion at 25 of a bottle. Between the neck portion 25 and the lower end of the blowing head a cylindrical area 26 is provided in the mold halves and this area may be selectively vented by means of an outlet tube 27 (needle type) under the control of a valve 28.

Following known practices a parison of molten plastic is extruded from head 10 with valve mold halves 19 and 20 open. The mold halves 19 and 20 then close to the position shown in FIG. 2 which pinches the lower end of the parison closed. At this time blowing air is admitted through the conduit 17 such that the parison is expanded to conform to the internal configuration of the mold halves illustrated.

Reference is now made to FIG. 1 which illustrates diagrammatically only the components of a system for the practice of the method of this invention. Numeral 30 indicates a water supply line. An air supply line is indicated at 31. The water entering the system through supply line 30 is at main pressure, which of course is dependent upon the locality. Air enters the systems through line 31 from a reservoir tank of a typical low pressure air compressor not shown. The pressure of the air in pressure line 31 is not particularly important in the practice of the method. It may be, for example, 80–90 pounds per square inch, the same as the blowing pressure and come from the same source.

Water supply line 30 goes to a compressor 32 which may be of conventional design such that it is capable of pressurizing water preferably to within the range of from about 1,000 to 2,000 pounds per square inch. As an example only, it will be assumed that this pressure is established at 1,500 pounds per square inch. Water at this pressure leaves compressor 32 through a line 33. An accumulator 34 may be used in line 33 such that the pressure within line 33 downstream of the compressor remains at a fairly constant value. A metering valve 35, preferably adjustable as indicated by the knob 36, is in line 33. Metered amounts of water leave valve 35 through a line 37 in which is installed a solenoid operated valve A.

Air supply line 31 enters a compressor 38 which is capable of selectively compressing the air to within the range of from about 1,000 to 2,000 pounds per square inch. To use a specific example, the air is compressed to 1,000 pounds per square inch, which is 500 pounds per square inch less than the pressure of water in line 37. The air at the specified pressure leaves the compressor through line 39. A check valve 40 is inserted in line 39 such that passage through this valve is only toward the right as viewed in FIG. 1. An accumulator 41 may also be used to stabilize the air pressure in line 39. Pressurized water and pressurized air meet at a Tee 42 which joins lines 37 and 39 downstream of check valve 40 and downstream of solenoid valve A. From Tee 42 a line 43 extends to a heat exchanger designated generally at numeral 44. The outer shell of the heat exchanger may be a cylinder that is capped at both ends and filled with an anti-freeze liquid. Line 43 passes through the heat exchanger being coiled within the anti-freeze liquid carried therein to exit from the right end of the heat exchanger as shown as a line 45 in which a solenoid valve designated B is installed. The line 45, and equivalent lines in the modifications of FIGS. 4-6, may be made of flexible material if required in a specific machine. The line 45 is identified in FIG. 2, as is solenoid valve B. The vertical tube shown at 18 in FIG. 2 is identified by this same number in FIG. 1.

The heat exchanger illustrated in FIG. 1 utilizes freon as a coolant. It comprises the usual system in which the gaseous refrigerant passes from a heat exchanger 46 through a line 47 to a compressor 48 and thence to the heat exchanger 44 through a line 49. It is preferred that two self-regulating valves 50 and 51 be provided in line 49 with provision being made to adjust each, or at least valve 51 such that the temperature of the anti-freeze liquid in heat exchanger 44 can be carefully controlled. A return line for the refrigerant shown at 52 extends from the heat exchanger 44 back to the heat exchanger 46. Preferably the line 49 inside the heat exchanger is coiled following the usual practice to exit from the heat exchanger as line 52.

Preferably, the flow of freon refrigerant through heat exchanger 44 is set such that the anti-freeze coolant within the heat exchanger 44 is held at approximately 34° F., or just slightly above the freezing temperature of water.

At the start it will be assumed that both solenoid valves A and B are closed. Water at 1500 pounds per square inch is in the lines 33 and 37 upstream of solenoid valve A. Air at 1,000 pounds per square inch is in the lines 39 and 43, the coil not shown extending through heat exchanger 44, and downstream of heat exchanger 44 to solenoid valve B.

In the last part of the previous cycle, solenoid A was opened so that there is a charge of water, initially at 1,500 pounds per square inch, sent into the line 43 and the coil through heat exchanger 44 and in the line 45 to solenoid B. The volume of this charge of water may be varied by adjusting valve 35. Since the water is pressurized to a greater extent than the air, back flow through line 39 is prevented at check valve 40. Thus, there is a mixture of pressurized air and water in the system downstream of check valve 40 through heat exchanger 44 to solenoid B. The water in the system in these areas becomes supersaturated with air. The net pressure of the mixture is somewhere between 1,000-1,500 pounds per square inch, being closer to the lower figure because of the small volume of water in the charge.

Reference is now made to FIG. 3 in which the horizontal line designated "one cycle" represents a time period for the formation of an article. The time of the cycle is dependent upon the speed at which the machine itself is operated. The available machines are capable of operating at extremely fast rates of production, but to take a specific example it will be assumed that the "one cycle" occurs in a time period of two seconds. (It could be much less, of course). During approximately one half of the cycle, or one second in the example chosen, blowing air at approximately 80-90 pounds per square inch expands the parison to conform to the internal configuration of the mold halves 19-20 shown. The instant the plastic material hits the inner walls of the mold halves it begins to cool as the result of the coolant circulating through passages 23-23. At approximately half way through the time cycle, or at the end of 1 second, solenoid B is opened. In the example shown, this valve remains open approximately one-half second. While open, valve B permits a discharge of the cooled and pressurized mixture of air and water, this mixture being explosively discharge from the lower end of the tube 18 directly into the newly formed article within the mold halves 19-20. At the end of the one-half second period of this example, solenoid B closes. Nothing further issues from the line 18 and during the last one-half second of the cycle of this example solenoid A opens to again admit a charge of water at 1,500 pounds per square inch into the system downstream of this valve, which includes the line through heat exchanger 44. It should be noted that air at 1,000 pounds per square inch is always available through check valve 40 through heat exchanger 44 and even through solenoid B when it is open. It further should be noted that the length of time that solenoid B is open can be varied and that the amount of pressurized water to enter the system through valve 35 may be varied.

The time that solenoid B is held open is dependent upon the internal volume of the article to be cooled. For a small article, the time is short. Larger articles call for more time. There is a practical upper limit for all sizes, however. The valve B must not remain open for such a long time that an internal pressure is built up within the newly formed article that would damage it or cause the mold halves to shift apart. In the example shown, the time that solenoid valve A is open remains constant because water that flows through it is metered at valve 35. Obviously however, metering could be accomplished by varying the timing of solenoid A. Here again, the volume of water used in a cycle is dependent upon the size of the article to be cooled.

The following phenomena take place during one cycle. Air at 1,000 pounds per square inch is present in the system upstream of solenoid valve B. When solenoid valve A opens, water at 1,500 pounds per square inch enters the system upstream of solenoid B. The pressures that exist cause the water to be supersaturated with air. The mixture is chilled to a point just above the freezing point of water.

It may be said that there is a "mixing chamber" for pressurized air and water in the part of the system downstream of solenoid valve A and check valve 40 through the heat exchanger 44 to solenoid B. When solenoid B opens, the pressurized and chilled mixture is explosively discharged in a state of adiabatic expansion to consist of (1) a substantial quantity of exceedingly fine ice crystals, (2) some water in the form of exceedingly fine, chilled droplets and (3) a gaseous phase consisting of both water vapor and air.

The ideal situation is to have a maximum amount of fine ice crystals present in the explosive discharge. This occurs in the system shown in FIG. 1, because the water that passes solenoid A is subjected to the low temperature of heat exchanger 44 for approximately 1 second in the time cycle chosen for illustrative purposes. The same is true of the pressurized air in the system. Thus, the two components are chilled prior to the explosive discharge so that the adiabatic expansion starts from a low temperature base, causing an instantaneous and radical drop in the temperature of the mixture thereby creating a preponderance of solids, as minute ice crystals, in the explosive discharge.

Figure 5:
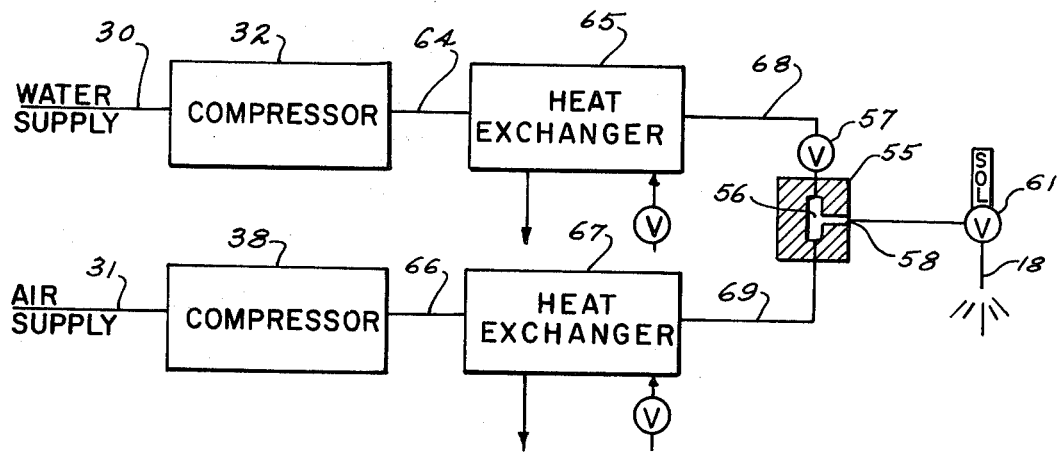
FIG. 5 is a view similar to FIG. 4 illustrating a further modification.
Figure 6:
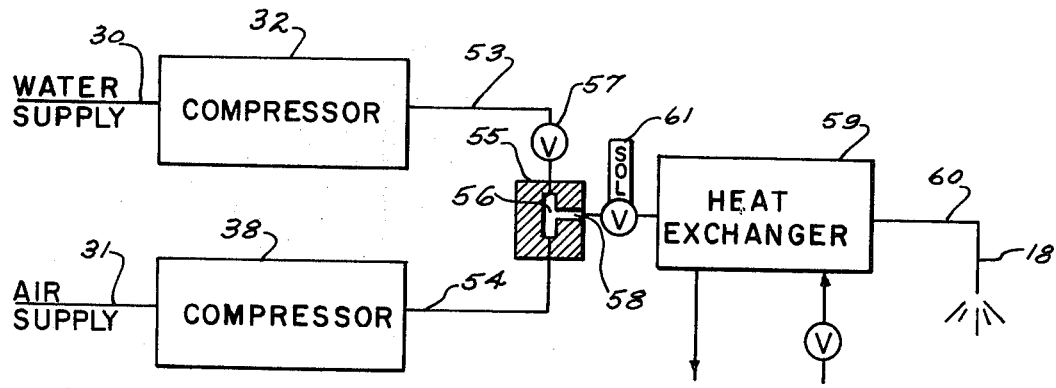
FIG. 6 is a view similar to FIG. 4 illustrating still another modification.

In the modified systems of FIGS. 4-6 the water and air supply lines, and the two compressors supplied by these lines, may be like those shown in FIG. 1, and these components of these systems are identified by the same numerals used in FIG. 1. Going to FIG. 4, a line 53 extends downstream from water compressor 32 and a line 54 extends downstream from air compressor 38. An accumulator may be used in each of these lines as is shown in FIG. 1. The two lines 53 and 54 enter the respective opposite sides of a device 55 configurated internally to provide a mixing chamber 56. The total capacity of the mixing chamber may be about 4-5 cc. A valve 57 is interposed between mixing chamber 56 and compressor 32 in line 53. Valve 57 is a "metering" valve, preferably adjustable, so that the amount of water flowing through line 53 into mixing chamber 56 can be controlled and varied per unit of time. Line 53, downstream of valve 57, enters the top of mixing chamber 56, whereas the line 54 carrying compressed air enters the bottom of mixing chamber 56. An outlet passage 58 is provided at the side of mixing chamber 56. As shown, this passage is approximately midway between the top and the bottom of the chamber 56. Passage 58 opens into a line that coils its way through a heat exchanger 59 to exit therefrom as a line 60 having a valve 61 therein. A coolant pipe such as that shown in FIG. 1 at 18 extends downwardly from valve 61. In the system of FIG. 4 there is only one solenoid operated valve, this being valve 61 in line 60. Refrigerant for heat exchanger 59 enters and leaves through lines such as shown at 62 and 63 respectively. The construction of heat exchanger 59 may be substantially like that of heat exchanger 44 of FIG. 1.

In the operation of the system of FIG. 4, using specific pressures by way of example only, line 53 carries water at approximately 1,500 pounds per square inch pressure, whereas line 54 carries air at about 1,400 pounds per square inch pressure. Air under this pressure is open to mixing chamber 56, through outlet 58, a coil within heat exchanger 59, and line 60 to solenoid operated valve 61. Water from line 53 is metered through valve 57 into mixing chamber 56. The only reason for having the water at 1,500 pounds per square inch is so that it is reasonably above the pressure of the air within chamber 56 and thus able to enter the chamber. In this case neither the air nor the water has been chilled when they meet in the mixing chamber 56. The chilling of the mixture occurs as it passes through the heat exchanger upon the opening of solenoid valve 61, this valve being opened only momentarily to permit an explosive charge of the now chilled mixture to be explosively injected into the newly formed article from coolant pipe 18.

Solenoid operated valve 61 is triggered by the closing of a switch operated in simple timed relation to the operation of the blowing head. Because there are so many ways to accomplish such timing within the knowledge of those skilled in the art, it is believed to be unnecessary to show or describe specific circuitry. It is only necessary that conditions be established such that solenoid valve 61 is opened sufficiently long to permit an adequate charge of coolant to explosively discharge into the newly formed article. The length of time is dependent upon the size of the article being blown. Another factor governed by the size of the article being blown is the amount of water that is metered into the mixing chamber 56 during each cycle. To use a specific example, in the blowing of a 22 oz. capacity bottle formed from about 36 grams of plastic, approximately 1 cc of water, or slightly less than this amount, is metered into the mixing chamber 56 per cycle.

In the system of FIG. 5 two heat exchangers are utilized, one for cooling water and one for cooling air. More specifically, a line 64 connects the water compressor 32 to a heat exchanger 65, whereas a line 66 connects the air compressor 38 to a heat exchanger 67. Chilled water leaves heat exchanger 65 through a line 68, whereas chilled air leaves heat exchanger 67 through a line 69. The same type of metering valve and mixing devices as those shown at 55 and 57 in FIG. 4 are used in the system of FIG. 5. Thus the same numerals are used for the same components in these Figures. The main differences between the system of FIGS. 4 and that of FIG. 5 is that two heat exchangers are used in the system of FIG. 5 and mixing of air and water occurs downstream of these heat exchangers in mixing chamber 56. One advantage of the system of FIG. 5 is that two different temperatures can be provided within the two heat exchangers, heat exchanger 65 being held to a temperature just above the freezing point of water with the temperature of heat exchanger 67 being held at a somewhat lower temperature, for example 10° F. The operation of the system of FIG. 5 is like that of FIG. 4 in that the timed opening of solenoid valve 61 permits an explosive discharge of a cooled and pressurized mixture of air and water from coolant pipe 18.

Going now to FIG. 6 wherein the same numerals are used for those parts of the system that are the same as the system of FIG. 4, it will be seen that the main difference between FIG. 6 and FIG. 4 is in the location of valve 61. In this instance the valve 61 is upstream of heat exchanger 59 so that the pressurized mixture is cooled while passing through the heat exchanger for discharge from coolant pipe 18.

In all four of the systems shown, the heat generated by the compressors, primarily in the air, is removed by chilling prior to the discharge of the mixture. Also in all four systems, the water is supersaturated with air so that the adiabatic expansion of this air including the free air in the charge, starting from a low temperature base, has a profound chilling effect on the mixture.

As stated, the pressure ranges set forth are by way of example only. In all instances the water is pressurized to an extent above that of the air so that the water may enter the already air pressurized areas of the systems. In experimenting with the systems air pressure as low as 500 pounds per square inch have been used with a satisfactory degree of success. Running the pressures up far above 2,000 pounds per square inch is feasible and theoretically increasingly effective, but requires heavier and more costly equipment. One criterion is that the pressure range be substantially above the blowing pressure used for expanding the parison to article shape so that an injection that is explosive in nature can be made into a still pressured, newly formed article to obtain the great degree of even dispersion of the air-water mixture, which is characteristic of the broad method concepts disclosed herein.

The article may be vented to relieve the pressure therein several ways. As shown in FIG. 2, a needle type vent or outlet tube of the type shown at 27 may be used with valve 28 timed to open immediately after the explosive discharge is made into the article. The valve may be dispensed with if desired. Another way of accomplishing the same end is simply to index the mold set 11 away from the mold head 10 to vent the article to atmospheric pressure. In this case the outlet tube 27 may be dispensed with. If this is done the cylindrical area 26 in the mold set 11 is not needed. Once away from the mold head, and while being indexed through positions to the place of being ejected from the mold, the residual heat within the walls of the article causes a fast boil-off of remaining water with the resulting cooling effect lowering the temperature of the article to a point where it is sufficiently stabilized to stand ejection from the mold. Some boil-off may occur even after ejection, at least evaporation may take place. Thus, at ejection or soon thereafter the article is dry internally.

It may be seen therefor that the article is cooled internally initially by the fine, complete dispersion of the cold three phase mixture, such that all parts of the article are coated evenly. Thereafter cooling progresses as a result of the boil-off of the moisture coating the walls. Finally, if any moisture remains, it is in such a minute amount, and so well dispersed that it evaporates rapidly leaving the article completely free of water.

We claim:

1. In the method of blow molding hollow plastic articles wherein molten plastic is extruded in the form of a parison, pinched between mold parts and then expanded outwardly into contact with the inner surfaces of said mold parts, said mold parts being chilled to effect external cooling of the newly formed article therein, the improvement for cooling the newly formed article internally that comprises providing a contained mixture of water supersaturated with air and air, which mixture is chilled to a point above but close to the freezing point of water and is pressurized to at least about 500 pounds per square inch, and explosively injecting said mixture into said article while the air of said mixture is in the state of adiabatic expansion to cause an instantaneous dispersion of the water component of the mixture to all internal surfaces of the article.

2. The improvement as set forth in claim 1 in which said mixture is pressurized and chilled to an extent such that rapid release of the mixture to an atmosphere at a substantially lower pressure results in the formation of fine ice crystals.

3. The improvement as set forth in claim 1 in which said mixture is pressurized to within a range of from about 500 to 5,000 pounds per square inch.

4. The improvement as set forth in claim 1 in which said mixture is pressurized above approximately 1,000 pounds per square inch and injected into said article while said article is closed and pressured with air at approximately 70 to 100 pounds per square inch.

5. The improvement as set forth in claim 1 in which the explosive injection of said mixture results in a three phase system comprising solids, liquids and gases.

6. The improvement as set forth in claim 5 in which said solids are in the form of fine ice crystals, the liquids are in the form of fine droplets of water, and the gases are in the form of water vapor and air.

7. In the method of blow molding hollow plastic articles wherein molten plastic is extruded in the form of a parison, pinched between mold parts and then expanded outwardly into contact with the inner surfaces of said mold parts, said mold parts being chilled to effect external cooling of the newly formed article therein, the improvement for cooling the newly formed article internally that comprises explosively injecting into said article a chilled mixture of water supersaturated with air and air, which mixture is initially pressurized to at least about 500 pounds per square inch, while the air of said mixture is in the state of adiabatic expansion to cause an instantaneous dispersion of the water component of the mixture to all internal surfaces of the article.

8. In the method set forth in claim 7, the step of providing a mixing chamber and introducing said air and said water into said chamber with the water initially pressurized to a greater extent than said air.

9. In the method set forth in claim 8 in which the water of said mixture is initially chilled to approximately 34° F.

10. In the method set forth in claim 8 in which said air and water are initially pressurized to within the range of from 500 to 2,000 pounds per square inch and said water is chilled to approximately 34° F.

11. In the method set forth in claim 8 in which said article is pressurized to a substantially lesser extent than said mixture and said article is vented to atmospheric pressure following the injection of said mixture thereinto.

* * * * *